United States Patent
Lee et al.

(10) Patent No.: US 9,178,201 B2
(45) Date of Patent: Nov. 3, 2015

(54) ELECTRODE ASSEMBLY AND METHOD FOR CONSTRUCTING THE SAME

(75) Inventors: Joo-Sung Lee, Daejeon (KR); Jong-Hun Kim, Daejeon (KR); Bo-Kyung Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 491 days.

(21) Appl. No.: 13/616,799

(22) Filed: Sep. 14, 2012

(65) Prior Publication Data

US 2013/0004817 A1 Jan. 3, 2013

Related U.S. Application Data

(63) Continuation of application No. PCT/KR2011/008514, filed on Nov. 9, 2011.

(30) Foreign Application Priority Data

Mar. 23, 2011 (KR) .................. 10-2011-0025851

(51) Int. Cl.
*H01M 2/16* (2006.01)
*H01M 2/14* (2006.01)

(52) U.S. Cl.
CPC .............. *H01M 2/166* (2013.01); *H01M 2/145* (2013.01); *Y10T 29/49115* (2015.01)

(58) Field of Classification Search
None
See application file for complete search history.

(56) References Cited

U.S. PATENT DOCUMENTS

| | | | | |
|---|---|---|---|---|
| 6,444,357 B1 * | 9/2002 | Kambe | .................. | H01M 4/02 429/149 |
| 7,081,142 B1 * | 7/2006 | Carlson | ............... | H01M 2/1686 29/623.5 |
| 2006/0008700 A1 | 1/2006 | Yong et al. | | |
| 2006/0199294 A1 | 9/2006 | Fujikawa et al. | | |
| 2006/0209383 A1 * | 9/2006 | Burdis | .................. | G02F 1/1523 359/265 |
| 2007/0180686 A1 * | 8/2007 | Woo | ........................ | H01M 6/10 29/623.1 |
| 2008/0161746 A1 * | 7/2008 | Visco | ..................... | A61K 33/00 604/20 |

(Continued)

FOREIGN PATENT DOCUMENTS

| | | |
|---|---|---|
| EP | 1 947 710 A1 | 7/2008 |
| JP | 2008-503049 A | 1/2008 |

(Continued)

*Primary Examiner* — Ula C Ruddock
*Assistant Examiner* — Scott J Chmielecki
(74) *Attorney, Agent, or Firm* — Birch, Stewart, Kolasch & Birch, LLP

(57) ABSTRACT

A jelly-roll type electrode assembly is disclosed. The jelly-roll type electrode assembly includes an anode, a cathode, and separators interposed between the anode and the cathode and having a greater length than width. Each of the separators is longer than the anode and the cathode. Each of the separators has a porous substrate and porous coating layers formed on both surfaces of the porous substrate. The porous coating layers include a mixture of inorganic particles and a binder polymer. The porous coating layers are formed only in areas where the separators are in contact with the anode and the cathode. The porous coating layers enhance the heat resistance of the separators. Due to the enhanced heat resistance, the separators can prevent the performance of a battery from deteriorating. In addition, the porous coating layers can be prevented from being separated from the separators during battery assembly processing.

12 Claims, 2 Drawing Sheets

(56) References Cited

U.S. PATENT DOCUMENTS

| | | |
|---|---|---|
| 2008/0274410 A1 | 11/2008 | Baba et al. |
| 2009/0130548 A1 | 5/2009 | Lee |
| 2009/0246614 A1* | 10/2009 | Kim ............. H01M 2/145 429/145 |
| 2010/0015510 A1 | 1/2010 | Tanaka et al. |
| 2010/0243427 A1* | 9/2010 | Kozlowski .......... C03C 17/3417 204/192.1 |
| 2010/0323230 A1 | 12/2010 | Lee et al. |
| 2011/0045338 A1 | 2/2011 | Bae et al. |
| 2011/0293977 A1* | 12/2011 | Kim ............. H01M 2/166 429/94 |

FOREIGN PATENT DOCUMENTS

| | | |
|---|---|---|
| JP | 2008-243660 A | 10/2008 |
| JP | 2009-211857 A | 9/2009 |
| JP | 2010-73339 A | 4/2010 |
| KR | 10-2007-0092621 A | 9/2007 |
| KR | 10-2008-0106718 A | 12/2008 |
| KR | 10-2009-0031156 A | 3/2009 |
| KR | 10-2009-0051374 A | 5/2009 |
| KR | 10-2009-0083854 A | 8/2009 |
| KR | 10-2009-0095478 A | 9/2009 |
| WO | WO 2007/105869 A1 | 9/2007 |

* cited by examiner

ELECTRODE ASSEMBLY AND METHOD FOR CONSTRUCTING THE SAME

CROSS-REFERENCE TO RELATED APPLICATION

This application is a continuation of International Application No. PCT/KR2011/008514 filed on Nov. 9, 2011, which claims priorities to Korean Patent Application No. 10-2011-0025851 filed in the Republic of Korea on Mar. 23, 2011, the entire contents of which are incorporated herein by reference.

TECHNICAL FIELD

The present disclosure relates to an electrode assembly for a secondary battery and a method for constructing the electrode assembly. More specifically, the present disclosure relates to an electrode assembly for a secondary battery which uses separators with porous coating layers to achieve improved heat resistance.

BACKGROUND ART

Recently, there has been growing interest in energy storage technologies. As the application fields of energy storage technologies have been extended to mobile phones, camcorders, notebook computers and even electric cars, efforts have increasingly been made towards the research and development of electrochemical devices. In this aspect, electrochemical devices have attracted the most attention. The development of secondary batteries capable of repeatedly charging and discharging has been the focus of particular interest. In recent years, extensive research and development has been conducted to design new electrodes and batteries for the purpose of improving capacity density and specific energy of the batteries.

Many secondary batteries are currently available. Lithium secondary batteries developed in the early 1990's have received a great deal of attention due to their advantages of higher operating voltages and much higher energy densities than conventional batteries using aqueous electrolyte solutions, such as Ni-MH batteries, Ni—Cd batteries and $H_2SO_4$—Pb batteries.

Generally, a secondary battery is fabricated by laminating or winding one or more unit cells, each of which includes a cathode, an anode and a separator interposed between the anode and the cathode, accommodating the laminated or wound unit cells in a metal can or a laminate sheet case, and injecting or impregnating an electrolyte solution thereinto.

Constituent electrode assemblies of secondary batteries have a cathode/separator/anode structure and are broadly classified into jelly-roll (i.e. winding) and stack (i.e. laminate) types by the constructions they have. A folding (jelly-roll) type electrode assembly is constructed by interposing a separator between a cathode and an anode, each of which is in the form of a long sheet to which an active material is applied, and winding the electrode structure. A stack type electrode assembly is constructed by sequentially laminating a plurality of cathodes and anodes, each of which has a predetermined size, between which separators are interposed. The jelly-roll type electrode assembly is easy to construct and has an advantage of high energy density per unit weight.

Porous polyolefin substrates are commonly used as separators of lithium secondary batteries including jelly-roll type electrode assemblies. Porous polyolefin substrates tend to undergo extreme thermal shrinkage at temperatures of 100° C. or higher due to their material characteristics and production processes including elongation. Under such circumstances, the introduction of an organic-inorganic porous coating layer into a separator has been suggested as an approach aimed at achieving improved heat resistance. However, when a mandrel is withdrawn or the separator is cut after winding in the course of the fabrication of an electrochemical device, defects may be caused. For example, the inorganic particles may fall off from the organic-inorganic porous coating layer or the organic-inorganic porous coating layer may be separated from the separator.

DISCLOSURE

Technical Problem

The present disclosure is designed to solve the problems of the prior art, and therefore it is an object of the present disclosure to provide an electrode assembly with improved heat resistance from which the separation of organic-inorganic porous coating layers is not possible in the course of the fabrication of an electrochemical device, and a method for constructing the electrode assembly.

Technical Solution

According to an aspect of the present disclosure, there is provided a jelly-roll type electrode assembly including an anode, a cathode, and separators interposed between the anode and the cathode and having a greater length than width, wherein each of the separators is longer than the anode and the cathode and has a porous substrate and porous coating layers formed on both surfaces of the porous substrate and including a mixture of inorganic particles and a binder polymer, and wherein the porous coating layers are formed only in areas where the separators are in contact with the anode and the cathode.

Each of the porous substrates may include porous polyolefin. Examples of preferred materials for the porous polyolefin substrates include polyethylene, polypropylene, polybutylene and polypentene.

As the inorganic particles, there may be used, for example, inorganic particles having a dielectric constant of at least 5 or inorganic particles having the ability to transport lithium ions.

Examples of preferred materials for the inorganic particles having a dielectric constant of at least 5 include $BaTiO_3$, $Pb(Zr_x Ti_{1-x})O_3$ (PZT, $0<x<1$), $Pb_{1-x}La_xZr_{1-y}Ti_yO_3$ (PLZT, $0<x<1$, $0<y<1$) $(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$.

Examples of preferred materials for the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$) and $P_2S_5$ type glass ($Li_xP_yS_z$, $0<x<3$, $0<y<3$, $0<z<7$).

As the binder polymer, there may be used, for example, polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, or a low molecular weight compound having a molecular weight of 10,000 g/mol or lower.

Preferably, the weight ratios of the inorganic particles to the binder polymer in the porous coating layers are each independently from 50:50 to 99:1.

According to another aspect of the present disclosure, there is provided a secondary battery including the electrode assembly and a case sealing and accommodating the electrode assembly together with an electrolyte.

Advantageous Effects

The jelly-roll type electrode assembly of the present disclosure is constructed to include separators having organic-inorganic porous coating layers with good heat resistance formed only in areas where the separators are in contact with an anode and a cathode. This construction can prevent the porous coating layers from being separated from the separators when a mandrel is withdrawn or the separators are cut after winding in the course of the fabrication of the electrochemical device, while ensuring high thermal stability of the battery.

Furthermore, the contact between the porous coating layers and a mandrel during winding is blocked so that the problem of poor winding resulting from different surface friction characteristics can be solved. The electrode assembly of the present disclosure is constructed such that none of the porous coating layers are formed on the outermost surface of the electrode assembly to which a tape is to be adhered during subsequent processing. Due to this construction, the porous coating layers can be prevented from being separated from the separators.

DESCRIPTION OF DRAWINGS

The accompanying drawings illustrate preferred embodiments of the present disclosure and together with the foregoing disclosure, serve to provide further understanding of the technical spirit of the present disclosure. However, the present disclosure is not to be construed as being limited to the drawings.

EXPLANATION OF REFERENCE NUMERALS

Figure 1:
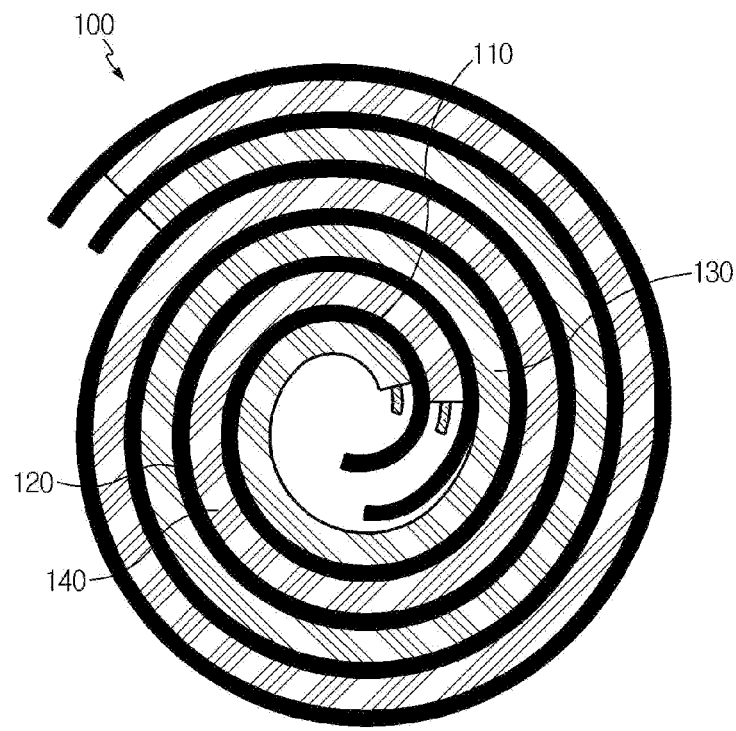
FIG. 1 is a cross-sectional view of a jelly-roll type electrode assembly using separators without a porous coating layer according to an embodiment.

100, 200, 300: Electrode assemblies
110, 210, 310: First separators
211, 221, 311, 321: Porous substrates
212, 222, 312, 322: Porous coating layers
120, 220, 320: Second separators
130, 230, 330: Cathodes
231, 241, 331, 341: Current collectors
232, 332: Cathode active material layers
140, 240, 340: Anodes
242, 342: Anode active material layers

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 2:
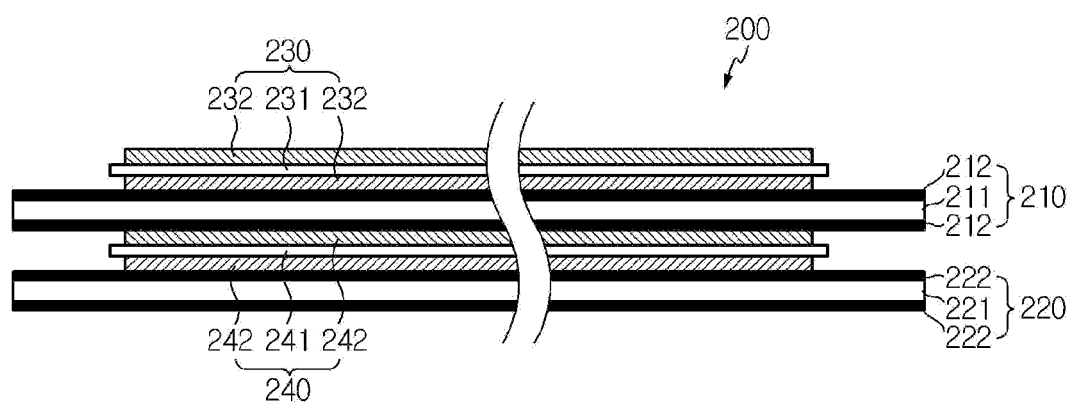
FIG. 2 is a cross-sectional view of a jelly-roll type electrode assembly using separators with porous coating layers according to an embodiment.
Figure 3:
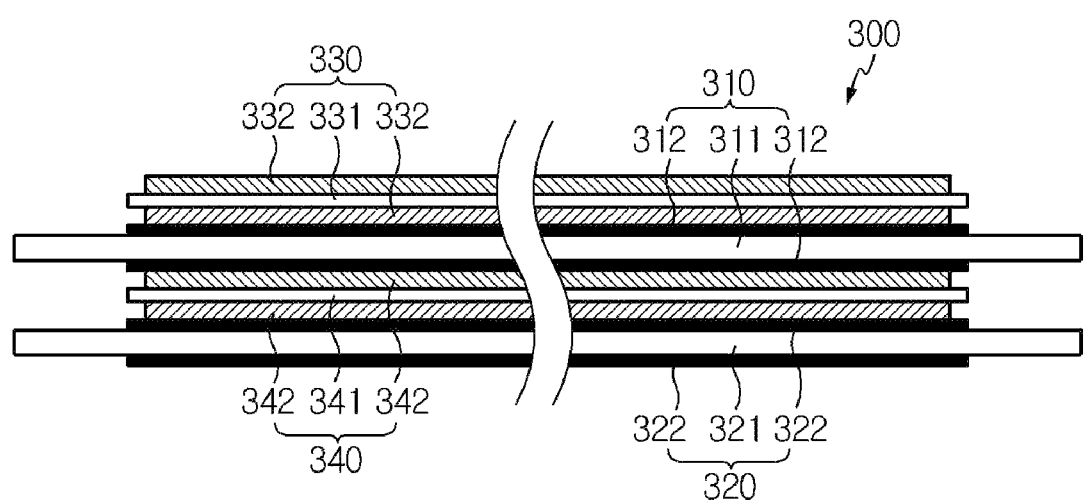
FIG. 3 is a cross-sectional view of a jelly-roll type electrode assembly using separators with porous coating layers formed only in areas where the separators are in contact with an anode and a cathode.

FIG. 1 illustrates a cross-sectional view of a jelly-roll type electrode assembly using separators without a porous coating layer according to an embodiment, FIG. 2 illustrates a cross-sectional view of a jelly-roll type electrode assembly using separators, each of which has porous coating layers formed on both surfaces thereof, according to an embodiment, and FIG. 3 illustrates a cross-sectional view of a jelly-roll type electrode assembly using separators with porous coating layers formed only in areas where the separators are in contact with an anode and a cathode. The cathode and the anode in each of the figures may be used interchangeably. However, the description proposed herein is just a preferable example for the purpose of illustrations only, not intended to limit the scope of the disclosure, so it should be understood that other equivalents and modifications could be made thereto without departing from the spirit and scope of the disclosure at the time of filing the present application.

Generally, a jelly-roll type electrode assembly for a battery, for example, a cylindrical battery is constructed by laminating a cathode, an anode and separators, and winding the laminate. Such an electrode assembly is illustrated in FIG. 1.

Referring to FIG. 1, the jelly-roll type electrode assembly 100 includes a cathode 130, an anode 140, and separators 110 and 120 interposed between the cathode plate and the anode plate. The jelly-roll type electrode assembly 100 has a core around which the cathode 130 and the separators 110 are rolled. When the jelly-roll type electrode assembly 100 generates heat during charge or use, the separators 110 and 120, which are generally produced by elongation, thermally shrinks. As a result of the thermal shrinkage, the cathode 130 may be brought into contact with the anode 140, which poses a risk of fire.

Referring to FIG. 2, the electrode assembly 200 includes a cathode 230, a first separator 210, an anode 240 and a second separator 220 laminated in this order. The first separator 210 includes a porous substrate 211 and porous coating layers 212 formed on both surfaces of the porous substrate 211. The second separator 220 includes a porous substrate 221 and porous coating layers 222 formed on both surfaces of the porous substrate 221. Each of the porous coating layers 212 and 222 includes a mixture of inorganic particles and a binder polymer. The porous coating layers 212 and 222 enhance the heat resistance of the first and second separators 210 and 220, respectively. Due to this enhanced heat resistance, the contact between the cathode 230 and the anode 240 is blocked so that short circuits between the electrodes can be prevented. The electrode assembly 200 is wound in the form of a jelly roll configuration using a mandrel. When the mandrel is removed after winding, the porous coating layers 212 and 222 may be separated from the separators 210 and 220, respectively. The porous coating layers 212 and 222 may also be separated from the separators 210 and 220, respectively, during cutting of the separators in the course of the construction of the electrode assembly and during taping after winding. The porous coating layers separated from the separators cause the occurrence of defects during battery assembly, resulting in a reduction in battery assembly yield. For the purpose of preventing the separation of the porous coating layers, an organic binder may be used in an excess amount. In this case, however, the resistance of the separators increases, which is a cause of poor performance of an electrochemical device.

Referring to FIG. 3, the electrode assembly 300 of the present disclosure includes a cathode 330, a first separator 310, an anode 340 and a second separator 320 laminated in this order. The first separator 310 includes a porous substrate 311 and porous coating layers 312 formed on both surfaces of the porous substrate 311. The second separator 320 includes a porous substrate 321 and porous coating layers 322 formed on both surfaces of the porous substrate 321. Each of the porous coating layers 312 and 322 includes a mixture of inorganic particles and a binder polymer. The porous coating layers 312 and 322 are formed only in areas where the separators are in contact with the anode 340 and the cathode 330. The porous coating layers 312 and 322 may be dimensioned to be slightly narrower or wider than the anode 340 and the cathode 330. It is preferred that the porous coating layers 312 and 322 are larger in width than the electrodes 340 and 330. Some portions of the porous substrates 311 and 321 are not coated with the porous coating layers 312 and 322, respectively. The uncoated portions of the separators 310 and 320 are not limited to particular length ranges. The lengths of the uncoated portions may be varied depending on situations. Alternatively, each of the substrates 310 and 320 may have a porous coating layer formed on at least one surface of the porous substrate. In the electrode assembly 300 of the present disclosure, the porous coating layers are formed only in areas where the separators are in contact with the anode and the cathode. Due to this construction, the porous coating layers 312 and 322 can be prevented from being separated from the separators during removal of a mandrel after winding in the course of the fabrication of an electrochemical device. In addition, the contact between the porous coating layers and a mandrel during winding is blocked so that the problem of poor winding resulting from different surface friction characteristics can be solved. When a conventional jelly-roll type electrode assembly is constructed by laminating a cathode, a first separator, an anode and a second separator in this order, followed by winding of the laminate around a mandrel from one end thereof, porous coating layers formed on the separators may be in contact with and be adhered to the mandrel, which increases the possibility that the porous coating layers may be separated from the separators or the winding may be unsatisfactory in the course of the construction of the electrode assembly. In contrast, the electrode assembly of the present disclosure is constructed such that the porous coating layers are not formed in areas where the separators are in contact with a mandrel, which reduces the risk of separation of the porous coating layers and poor winding. The reduced risk of separation of the porous coating layers can contribute to a reduction in the amount of the binder polymer used. This leads to a reduction in the resistance of the separators, and as a result, an electrochemical device including the electrode assembly is expected to have improved performance.

The porous coating layers 312 and 322 of the separators 310 and 320 are formed by intermittent coating such that they are not formed in portions of the separators to be cut during subsequent processing. This can prevent the porous coating layers 312 and 322 from being separated from the separators upon cutting of the separators in the course of the construction of the electrode assembly. A taping process is required to fix the electrode assembly after winding. Since none of the porous coating layers are formed on the outermost surface of the electrode assembly, the porous coating layers can be prevented from being separated from the separators in the taping process.

As described above, each of the porous coating layers is composed of a mixture of inorganic particles and a binder polymer. In each of the porous coating layers, the binder polymer attaches (that is, connects and fixes) the inorganic particles to each other so as to maintain a state in which the inorganic particles are bound to each other. The binder polymer also functions to maintain a state in which the porous coating layers are bound to the corresponding porous substrates. The inorganic particles of the porous coating layers are in substantial contact with each other and have a closest packed structure. Interstitial volumes created between the inorganic particles in contact with each other become pores of the porous coating layers.

After winding, the jelly-roll type electrode assembly is inserted into a battery case to fabricate a battery. The battery case may be a cylindrical or prismatic can. Alternatively, the battery case may be a pouch. When a conventional electrode assembly is inserted into a battery case to fabricate a battery, a large surface frictional force of the electrode assembly impedes the fabrication of the battery. In view of this, the jelly-roll type electrode assembly of the present disclosure may optionally use another separator without a porous coating layer. The separator has an area sufficient to surround the outermost surface of the electrode assembly. In this case, the surface frictional force of the electrode assembly is not large because the separator without a porous coating layer is arranged on the outermost surface of the electrode assembly. When a conventional jelly-roll type electrode assembly is inserted into a battery case, porous coating layers may be separated from the electrode assembly by friction with the battery case. In contrast, since the porous coating layers are not exposed to the outermost surface of the jelly-roll type electrode assembly of the present disclosure, they can be prevented from being separated from the separators.

Each of the porous substrates used in the present disclosure may include porous polyolefin. Examples of preferred materials for the porous polyolefin substrates include polyethylene, polypropylene, polybutylene and polypentene.

The inorganic particles may be, for example, inorganic particles having a dielectric constant of at least 5 or inorganic particles having the ability to transport lithium ions.

The inorganic particles having a dielectric constant of at least 5 are preferably selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$ particles, and mixtures thereof.

The inorganic particles having the ability to transport lithium ions are preferably selected from the group consisting of lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles, lithium nitride ($Li_xN_y$, $0<x<4$, $0<y<2$) particles, $SiS_2$ type glass ($Li_xSi_yS_z$, $0<x<3$, $0<y<2$, $0<z<4$) particles, $P_2S_5$ type glass ($Li_xP_yS_z$, $0<x<3$, $0<y<3$, $0<z<7$) particles, and mixtures thereof.

The binder polymer may be selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and low molecular weight compounds having a molecular weight of 10,000 g/mol or lower.

Preferably, the weight ratios of the inorganic particles to the binder polymer in the porous coating layers are each independently from 50:50 to 99:1.

The present disclosure also provides a secondary battery including the jelly-roll type electrode assembly and a case sealing and accommodating the electrode assembly together with an electrolyte.

There is no particular restriction on the production methods of the cathode and the anode. Each of the electrodes can be produced by binding an electrode active material to an electrode current collector using suitable methods known in the art. The cathode active material may be any of those that are commonly used in cathodes of conventional electrochemical devices. Non-limiting examples of particularly preferred cathode active materials include lithiated manganese oxides, lithiated cobalt oxides, lithiated nickel oxides, lithiated iron oxides, and composite oxides thereof. The anode active material may be any of those that are commonly used in anodes of conventional electrochemical devices. Non-limiting examples of particularly preferred anode active materials include lithium, lithium alloys, and lithium intercalation materials, such as carbon, petroleum coke, activated carbon, graphite and other carbon materials. Non-limiting examples of cathode current collectors suitable for use in the cathode include aluminum foils, nickel foils, and combinations thereof. Non-limiting examples of anode current collectors suitable for use in the anode include copper foils, gold foils, nickel foils, copper alloy foils, and combinations thereof.

The electrolyte consists of a salt and an organic solvent capable of dissolving or dissociating the salt. The salt has a structure represented by $A^+B^-$ wherein $A^+$ is an alkali metal cation, such as $Li^+$, $Na^+$, $K^+$ or a combination thereof, and $B^-$ is an anion, such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof. The electrolyte may be injected in any suitable step during fabrication of the battery depending on the manufacturing processes and desired physical properties of a final product. Specifically, the electrolyte may be injected before battery assembly or in the final step of battery assembly.

The battery case may be any of those commonly used in the art. There is no restriction on the shape of the battery case according to the intended application of the battery. For example, the battery case may be a cylindrical or prismatic can. Alternatively, the battery case may have a pouch or a coin shape.

The present disclosure also provides a method for constructing the electrode assembly. The method of the present disclosure is carried out as follows.

First, porous substrates are prepared. Each of the porous substrates may be made of porous polyolefin. The porous polyolefin substrates may be made of at least one polymer selected from the group consisting of polyethylene, polypropylene, polybutylene and polypentene. A slurry including a mixture of inorganic particles and a binder polymer is intermittently coated on one or both surfaces of each of the porous substrates to form porous coating layers, completing the production of a separator. The method for intermittent coating of the slurry is not particularly limited. Knife coating or slot die coating is preferred. For intermittent coating of the slurry by knife coating, a knife is allowed to come into periodic contact with the surface of the porous substrate. For intermittent coating by slot die coating, the amount of the slurry supplied from a pump is controlled such that the slurry is discontinuously supplied to the surface of the porous substrate.

Thereafter, the separators are laminated alternately with a cathode and an anode, followed by winding to construct the jelly-roll type electrode assembly in which the separators having the porous coating layers are formed only in areas where the separators are in contact with the anode and the cathode.

The present disclosure will be explained in detail with reference to the following examples. However, these examples may be embodied in various different forms and should not be construed as limiting the scope of the present disclosure. The examples are provided to more fully explain the present disclosure to those having ordinary knowledge in the art to which the present disclosure pertains.

EXAMPLES

Example 1

Separator Having Porous Coating Layer Formed at One Surface Thereof

Polyvinylidene fluoride-co-chlorotrifluoroethylene (PVdF-CTFE) and cyanoethylpullulan in a weight ratio of 10:2 were added to and dissolved in acetone at 50° C. for about 12 hr. To the polymer solution was added $Al_2O_3$ powder in such an amount that the weight ratio of the polymers to the inorganic particles was 5:95. The inorganic particles were crushed and dispersed in the solution by ball milling for at least 12 hr to prepare a slurry. The inorganic particles of the slurry had an average particle size of 600 nm.

The slurry was coated to a thickness of 4 μm on one surface of a 12 μm thick porous polyolefin membrane (porosity 40%) using a slot die coater. For intermittent coating, the amount of the slurry supplied was controlled such that about 90 mm long uncoated portions were formed on both ends of the porous membrane.

Subsequently, the coated substrate was passed through a drier whose temperature was set to 50° C. to remove the solvent, completing the production of a separator. The bonding strength between the porous polyethylene membrane and the coating layer was as low as 10 gf/cm. Despite the low bonding strength, the inorganic particles did not fall off from the coating layer in the course of the fabrication of a cylindrical battery including holding the uncoated portions of the separator by a mandrel during assembly.

Example 2

Separator Having Porous Coating Layers Formed at Both Surfaces Thereof

A slurry was prepared in the same manner as in Example 1. The slurry was coated to thicknesses of 2 μm on both surfaces of a 12 μm thick porous polyolefin membrane (porosity 40%) using a dip coater. For intermittent coating of the slurry, a knife was allowed to come into periodic contact with the surfaces of the porous membrane such that about 90 mm long uncoated portions were formed on both ends of the porous membrane.

Subsequently, the coated substrate was passed through a drier whose temperature was set to 50° C. to remove the solvent, completing the production of a separator. The bonding strength between the porous polyethylene membrane and the coating layers was as low as 15 gf/cm. Despite the low bonding strength, the inorganic particles did not fall off from the coating layers in the course of the fabrication of a cylindrical battery including holding the uncoated portions of the separator by a mandrel during assembly.

Comparative Example 1

Separator Having Porous Coating Layers

A separator was produced in the same manner as in Example 2, except that an uncoated portion was not formed. The bonding strength between the porous polyethylene membrane and the coating layers was as low as 15 gf/cm, which is at the same level as that in Example 2. The inorganic particles fell off from the coating layers when the coating layers were held by a mandrel during assembly.

What is claimed is:

1. A jelly-roll type electrode assembly comprising:
   an anode, a cathode, and separators interposed between the anode and the cathode and having a greater length than width,
   wherein each of the separators is longer than the anode and the cathode and has a porous substrate and porous coating layers formed on both surfaces of the porous substrate and comprising a mixture of inorganic particles and a binder polymer,
   wherein a width of the porous coating layers is greater than widths of the anode and cathode,
   wherein the separator has uncoated portions where the porous substrate is not coated with the porous coating layer,
   wherein the uncoated portions are on an outermost surface of the electrode assembly where tape is to be adhered and on a part contacting a mandrel, and
   wherein the porous coating layers are formed only in areas where the separators are in contact with the anode and the cathode.

2. The jelly-roll type electrode assembly according to claim 1, wherein each of the porous substrates comprises porous polyolefin.

3. The jelly-roll type electrode assembly according to claim 2, wherein each of the porous polyolefin substrates is made of at least one polymer selected from the group consisting of polyethylene, polypropylene, polybutylene and polypentene.

4. The jelly-roll type electrode assembly according to claim 1, wherein the inorganic particles are selected from the group consisting of inorganic particles having a dielectric constant of at least 5, inorganic particles having the ability to transport lithium ions, and mixtures thereof.

5. The jelly-roll type electrode assembly according to claim 4, wherein the inorganic particles having a dielectric constant of at least 5 are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ particles, and mixtures thereof.

6. The jelly-roll type electrode assembly according to claim 4, wherein the inorganic particles having the ability to transport lithium ions are selected from the group consisting of lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles, lithium nitride ($Li_xN_y$, $0<x<4$, $0<y<2$) particles, $SiS_2$ type glass ($Li_xSi_yS_z$, $0<x<3$, $0<y<2$, $0<z<4$) particles, $P_2S_5$ type glass ($Li_xP_yS_z$, $0<x<3$, $0<y<3$, $0<z<7$) particles, and mixtures thereof.

7. The jelly-roll type electrode assembly according to claim 1, wherein the binder polymer is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, low molecular weight compounds having a molecular weight of 10,000 g/mol or lower, and mixtures thereof.

8. The jelly-roll type electrode assembly according to claim 1, wherein the inorganic particles and the binder polymer are present in a weight ratio of 50:50 to 99:1.

9. A secondary battery comprising the jelly-roll type electrode assembly according to claim 1 and a case sealing and accommodating the electrode assembly together with an electrolyte.

10. A method for constructing the jelly-roll type electrode assembly according to claim 1, the method comprising:
    intermittently coating a slurry comprising a mixture of inorganic particles and a binder polymer on the surfaces of porous substrates to produce separators with porous coating layers; and
    alternately laminating the separators with a cathode and an anode, and winding to construct the jelly-roll type electrode assembly.

11. The method according to claim 10, wherein the slurry is intermittently coated by knife coating while allowing a knife to come into periodic contact with the surfaces of the porous substrates.

12. The method according to claim 10, wherein the slurry is intermittently coated by slot die coating while allowing the slurry to be discontinuously supplied to the surfaces of the porous substrates.

* * * * *